(12) United States Patent
Park et al.

(10) Patent No.: US 9,726,895 B2
(45) Date of Patent: Aug. 8, 2017

(54) WEARABLE DISPLAY DEVICE HAVING A SLIDING STRUCTURE

(71) Applicant: INDUSTRY-UNIVERSITY COOPERATION FOUNDATION HANYANG UNIVERSITY, Seoul (KR)

(72) Inventors: Jong-il Park, Seoul (KR); Byung-kuk Seo, Seoul (KR)

(73) Assignee: INDUSTRY-UNIVERSITY COOPERATION FOUNDATION HANYANG UNIVERSITY, Seoul (KR)

(*) Notice: Subject to any disclaimer, the term of this patent is extended or adjusted under 35 U.S.C. 154(b) by 0 days.

(21) Appl. No.: 15/088,544

(22) Filed: Apr. 1, 2016

(65) Prior Publication Data

US 2016/0216519 A1    Jul. 28, 2016

Related U.S. Application Data

(63) Continuation-in-part of application No. 13/887,500, filed on May 6, 2013, now Pat. No. 9,329,391.

(30) Foreign Application Priority Data

Aug. 7, 2012   (KR) .................. 10-2012-0086484
Aug. 24, 2012  (KR) .................. 10-2012-0092937
(Continued)

(51) Int. Cl.
G02B 27/01    (2006.01)
G06F 1/16     (2006.01)
G06F 3/01     (2006.01)

(52) U.S. Cl.
CPC ......... G02B 27/0176 (2013.01); G06F 1/163 (2013.01); G06F 3/011 (2013.01);
(Continued)

(58) Field of Classification Search
None
See application file for complete search history.

(56) References Cited

U.S. PATENT DOCUMENTS 7,542,012 B2 *   6/2009   Kato ................. G02B 27/0176
                                              345/1.1
2005/0052558 A1 * 3/2005  Yamazaki ............ G06K 9/228
                                              348/333.12
(Continued)

*Primary Examiner* — Carolyn R Edwards
*Assistant Examiner* — Bipin Gyawali
(74) *Attorney, Agent, or Firm* — Ladas & Parry LLP; Loren K. Thompson

(57) ABSTRACT

A wearable display device that employs a sliding structure is disclosed. The device includes: a frame; a main unit coupled to the frame; a non-bending part, which includes a camera configured to capture an image of a forward direction, and which is coupled to the main unit and is configured to slide to a first position; a hinge coupled with the non-bending part; and a bending part, which is configured to provide image information to a user, and which is coupled with the hinge to rotate within a predefined angle. When the bending part is rotated, the camera is exposed to the exterior and moves from the first position to a second position. The device prevents malfunctioning and damage even when the device is worn for extended periods, and it is possible to resolve the problem of the wearable display device obstructing the field of vision when not in use.

15 Claims, 18 Drawing Sheets

(30) Foreign Application Priority Data

Mar. 15, 2013 (KR) .......................... 10-2013-0027645
Apr. 8, 2013 (KR) .......................... 10-2013-0038272

(52) U.S. Cl.
CPC ................ *G02B 2027/0138* (2013.01); *G02B 2027/0156* (2013.01); *G02B 2027/0178* (2013.01)

(56) References Cited

U.S. PATENT DOCUMENTS

| | | | |
|---|---|---|---|
| 2007/0081818 A1* | 4/2007 | Castaneda | H04M 1/0264 396/429 |
| 2010/0245585 A1* | 9/2010 | Fisher | H04M 1/6066 348/164 |
| 2012/0263449 A1* | 10/2012 | Bond | G03B 17/54 396/420 |
| 2013/0249776 A1* | 9/2013 | Olsson | G06F 1/163 345/8 |

* cited by examiner

[Fig. 1]
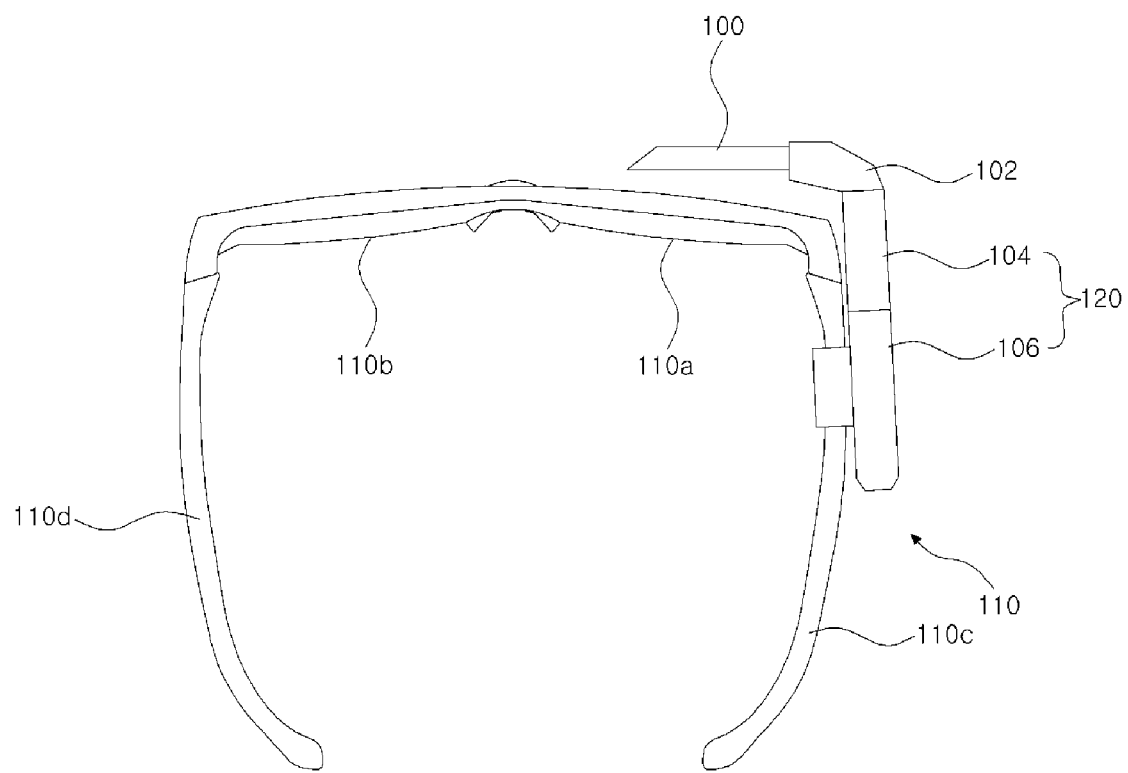

[Fig. 2]
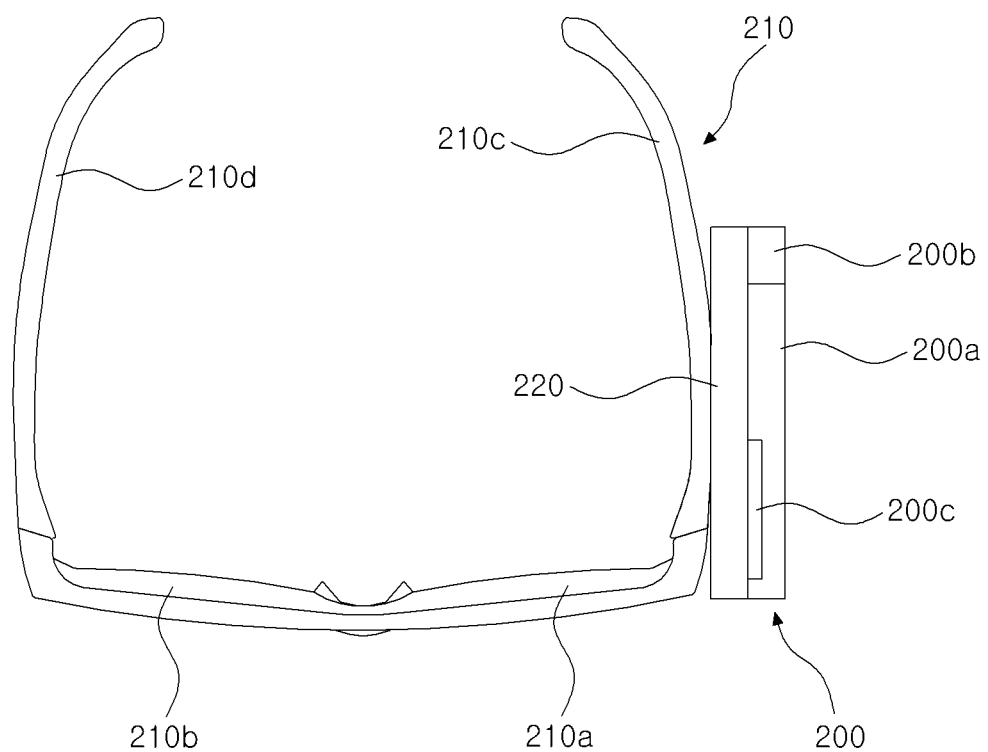

[Fig. 3]
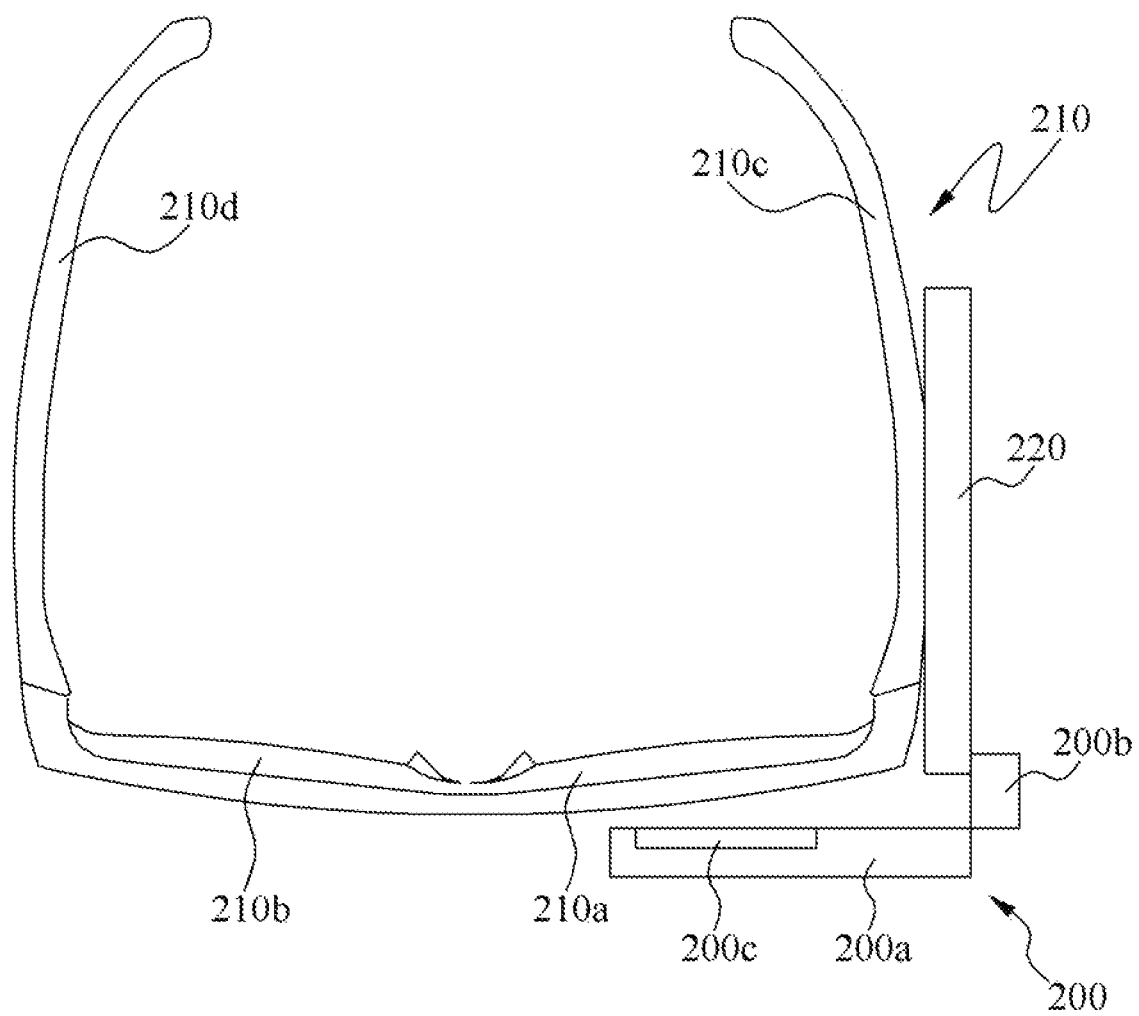

[Fig. 4]
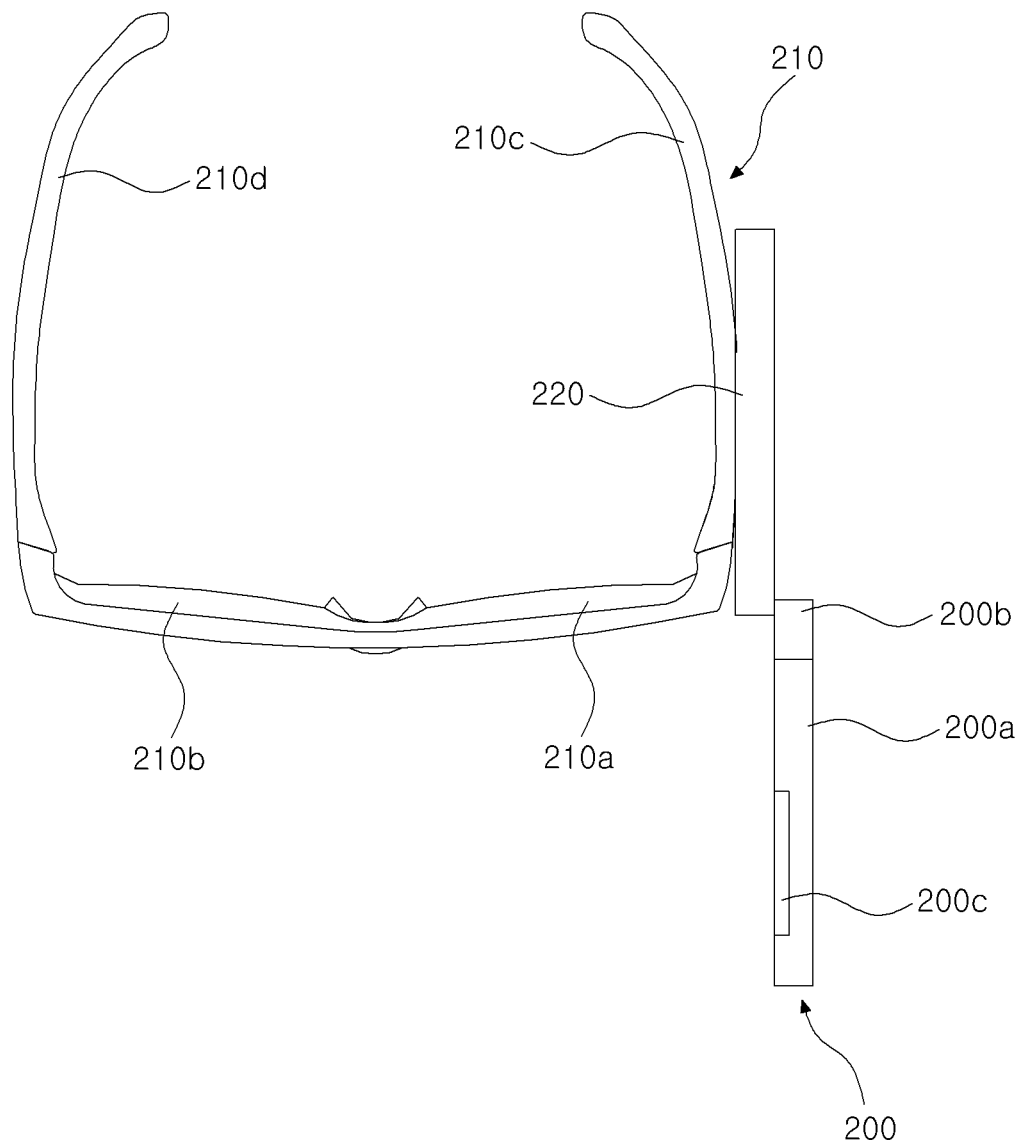

[Fig. 5]
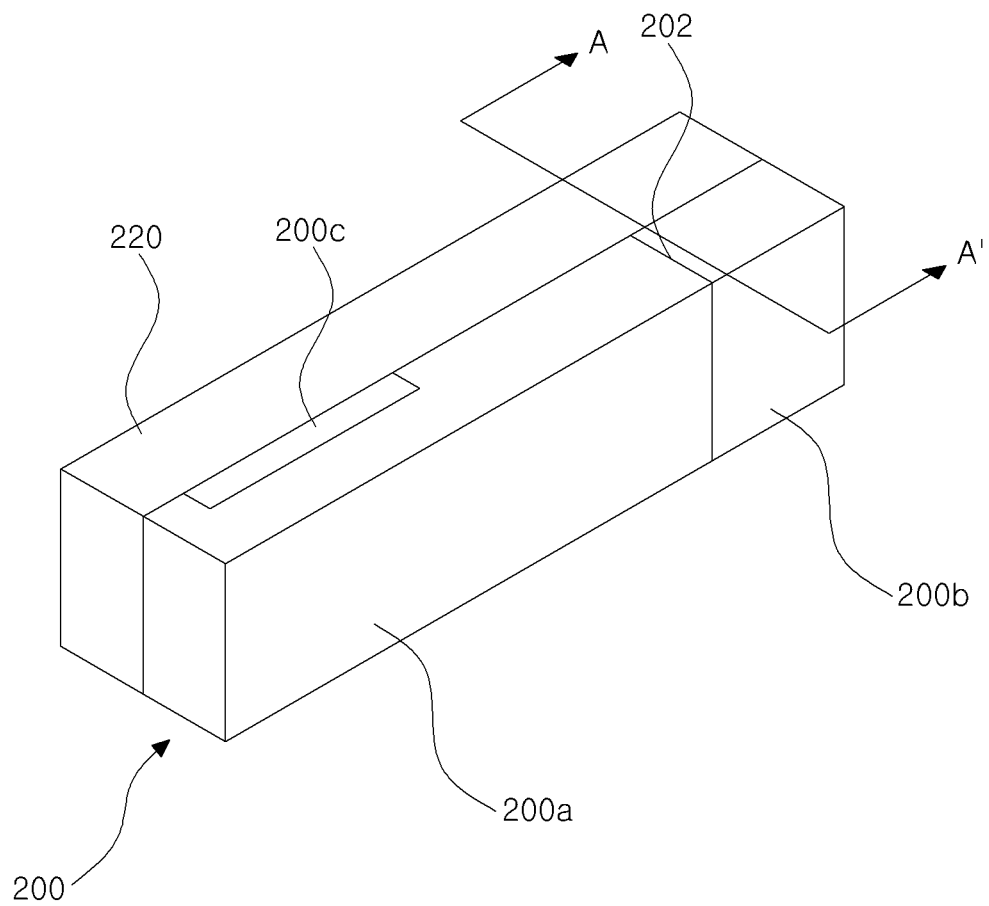

[Fig. 6]
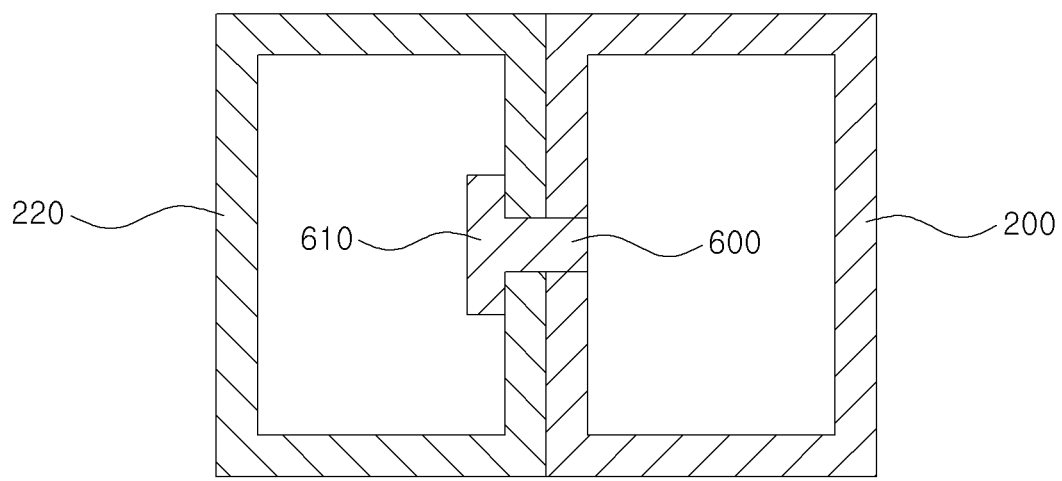

[Fig. 7]
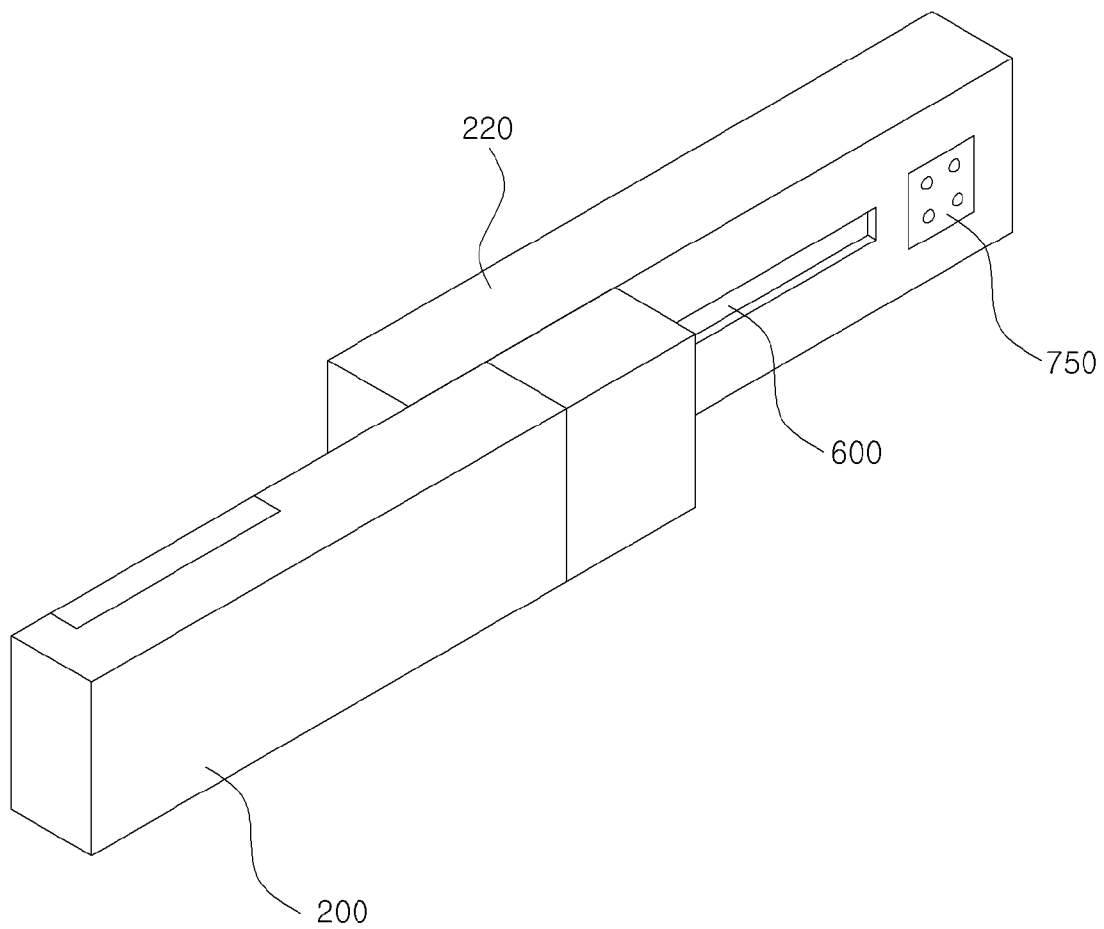

[Fig. 8A]
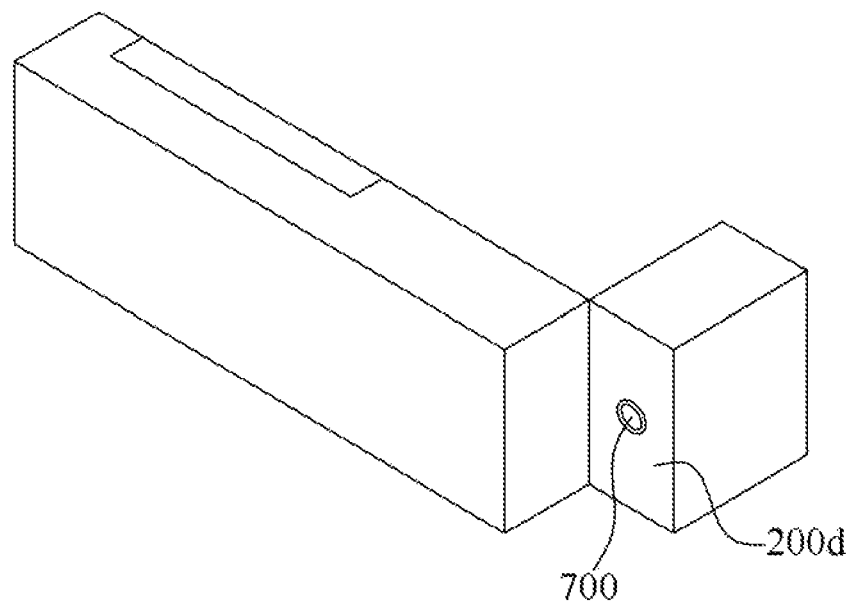

[Fig. 8B]
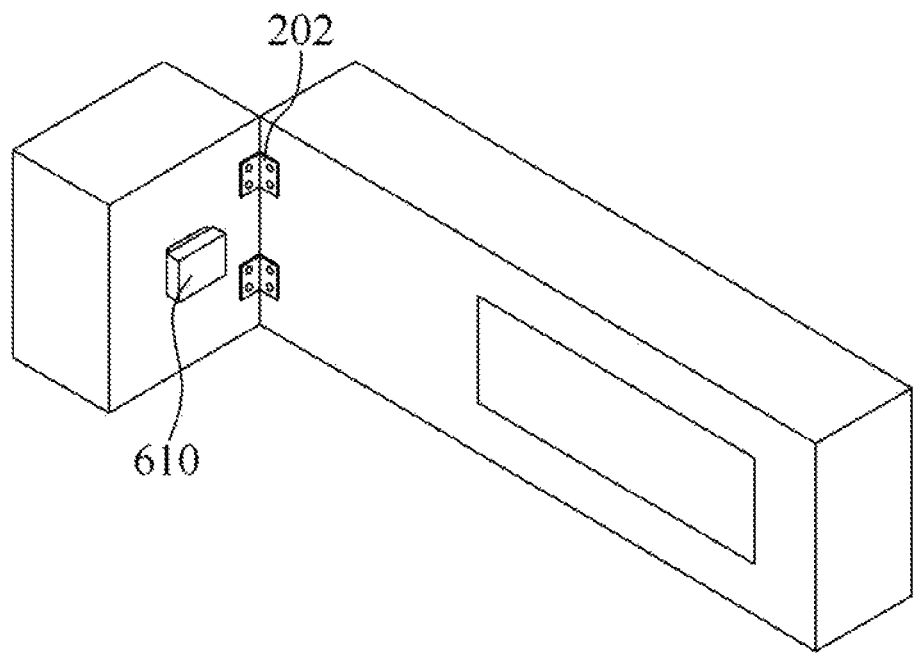

[Fig. 9]
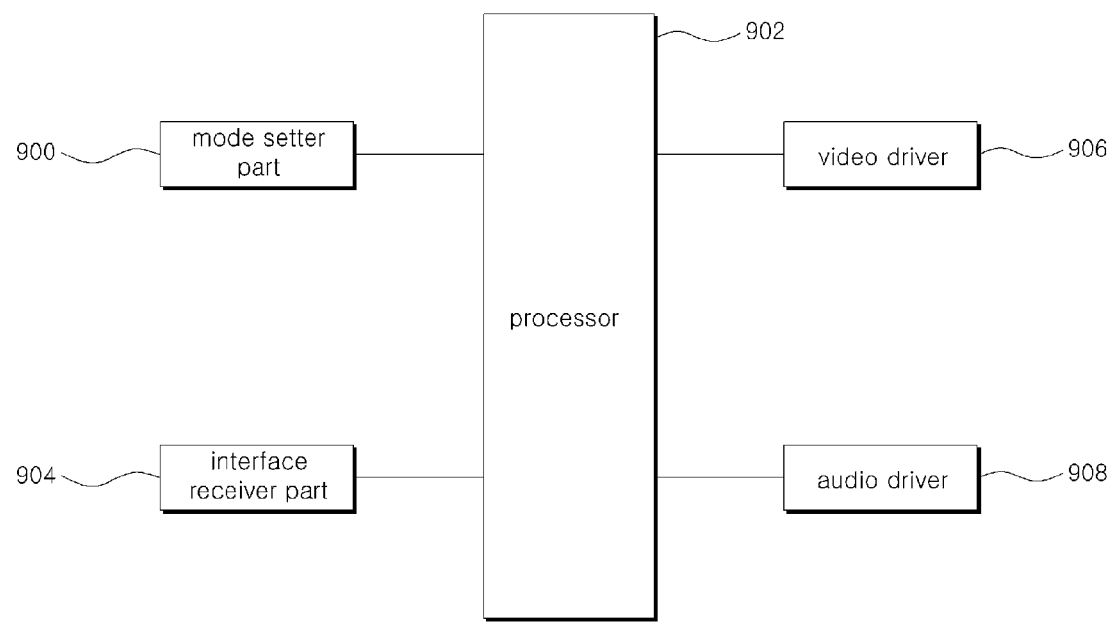

[Fig. 10]
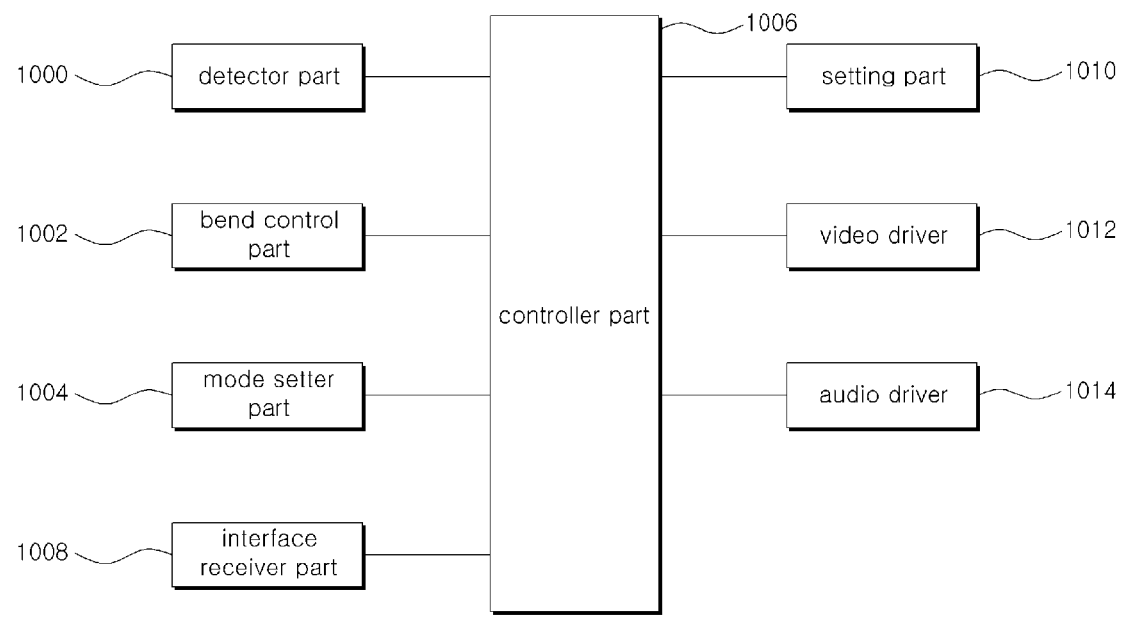

[Fig. 11]
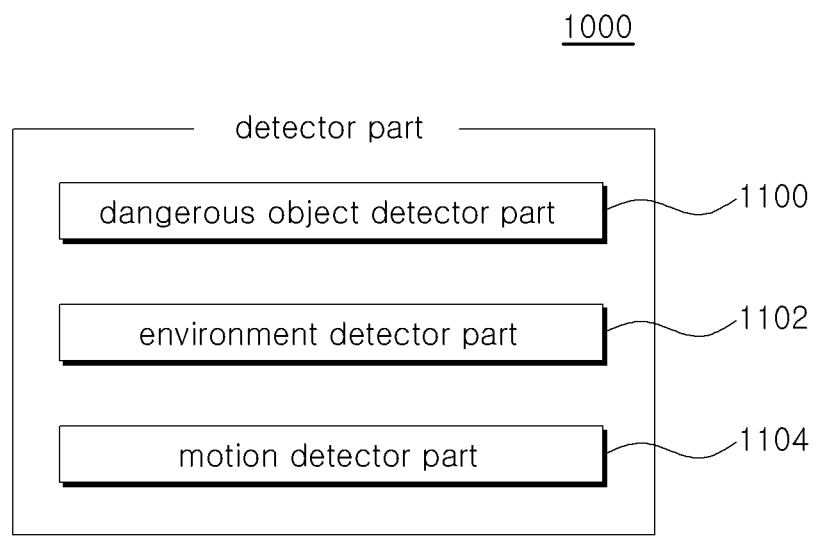

[Fig. 12]
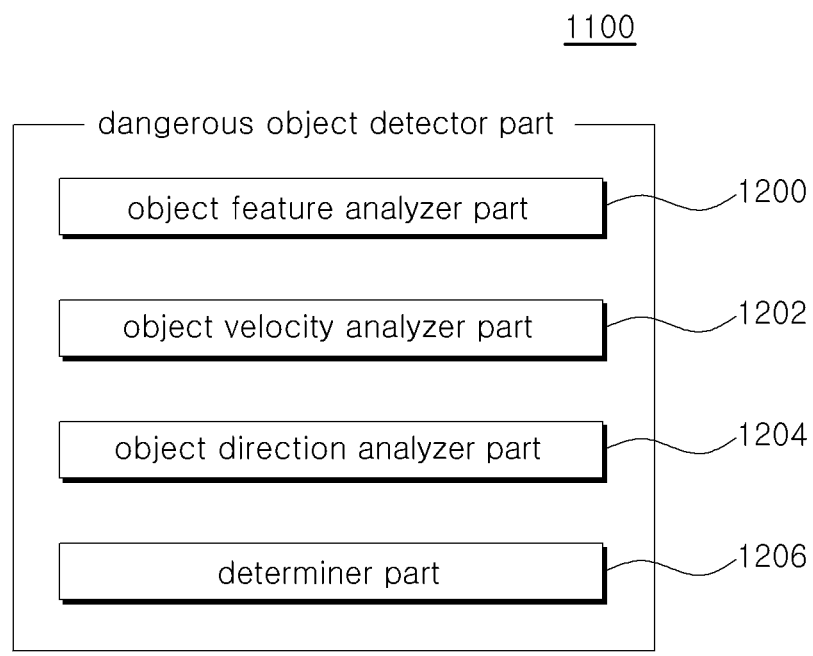

[Fig. 13A]
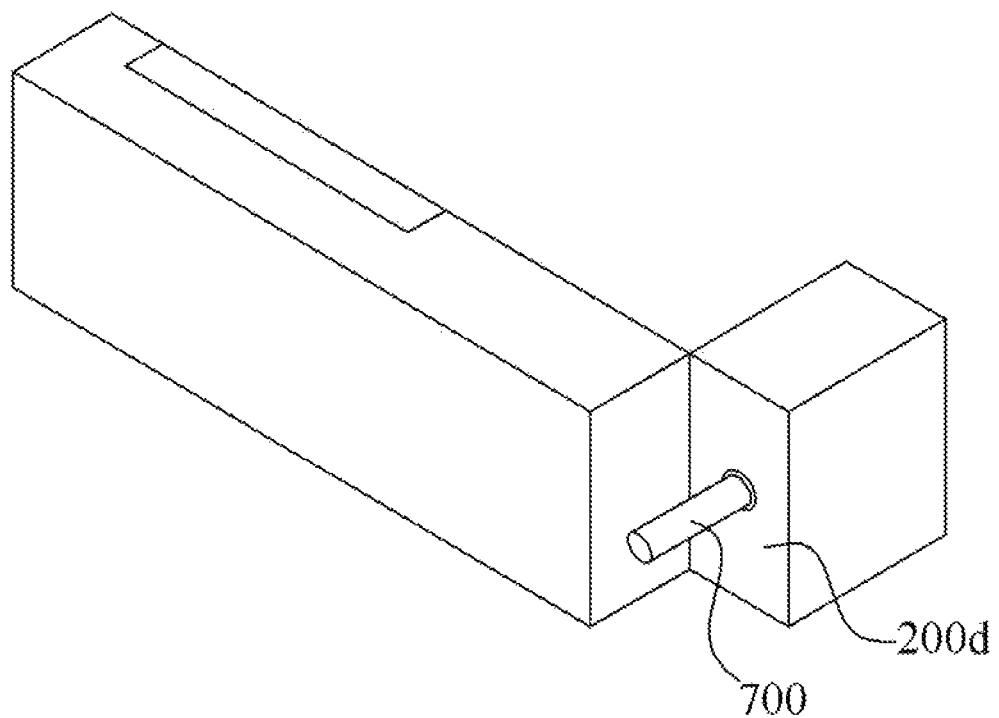

[Fig. 13B]
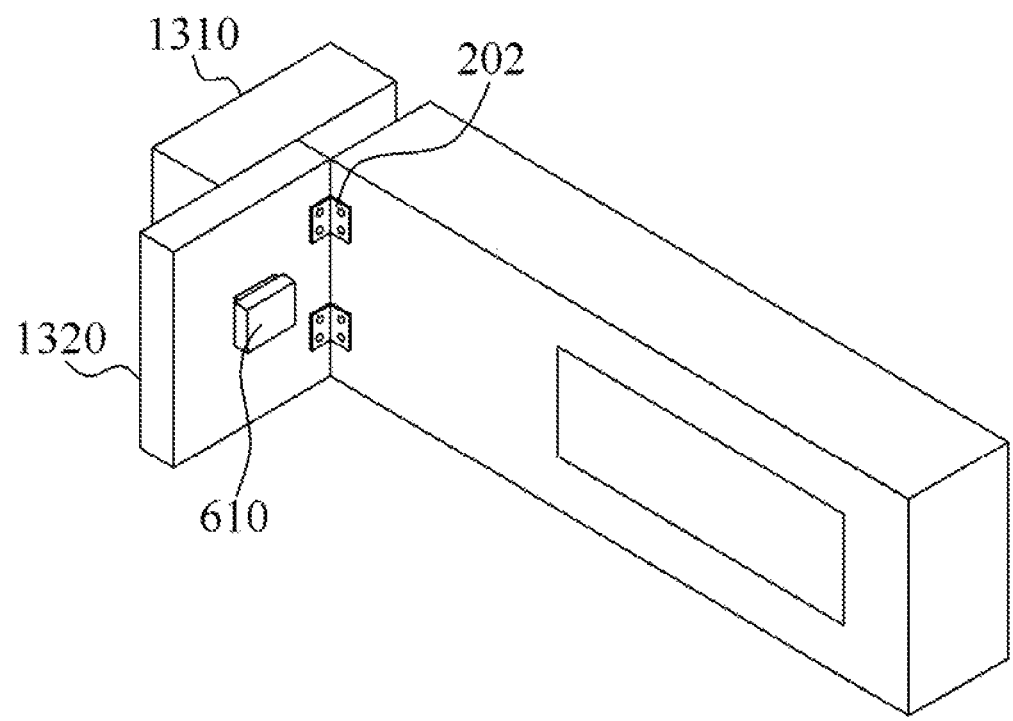

[Fig. 13C]
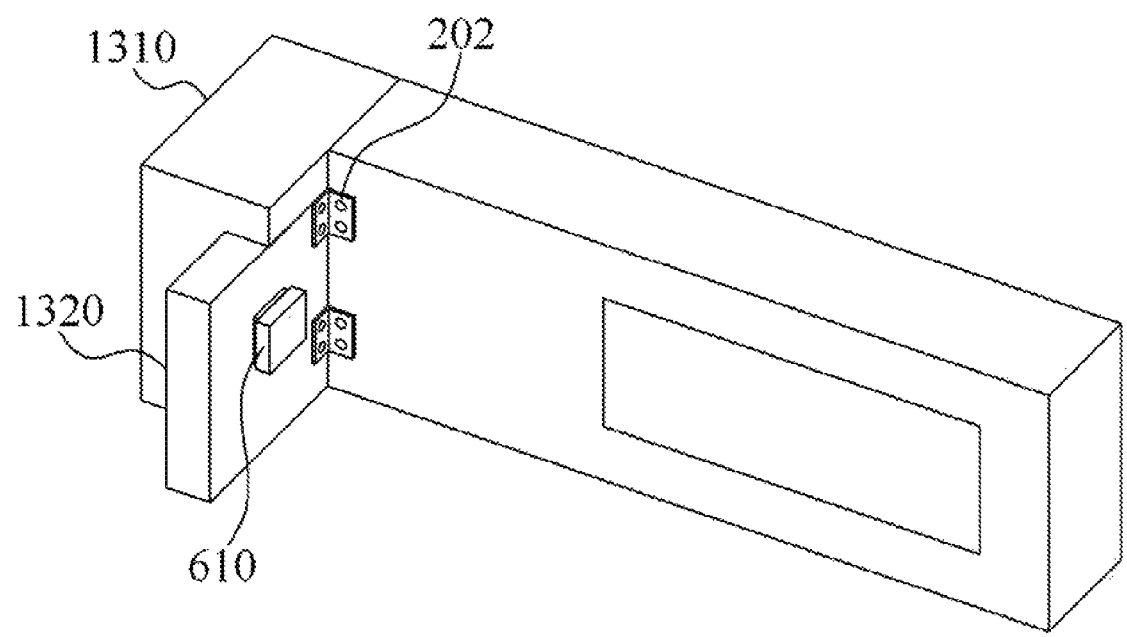

[Fig. 14]
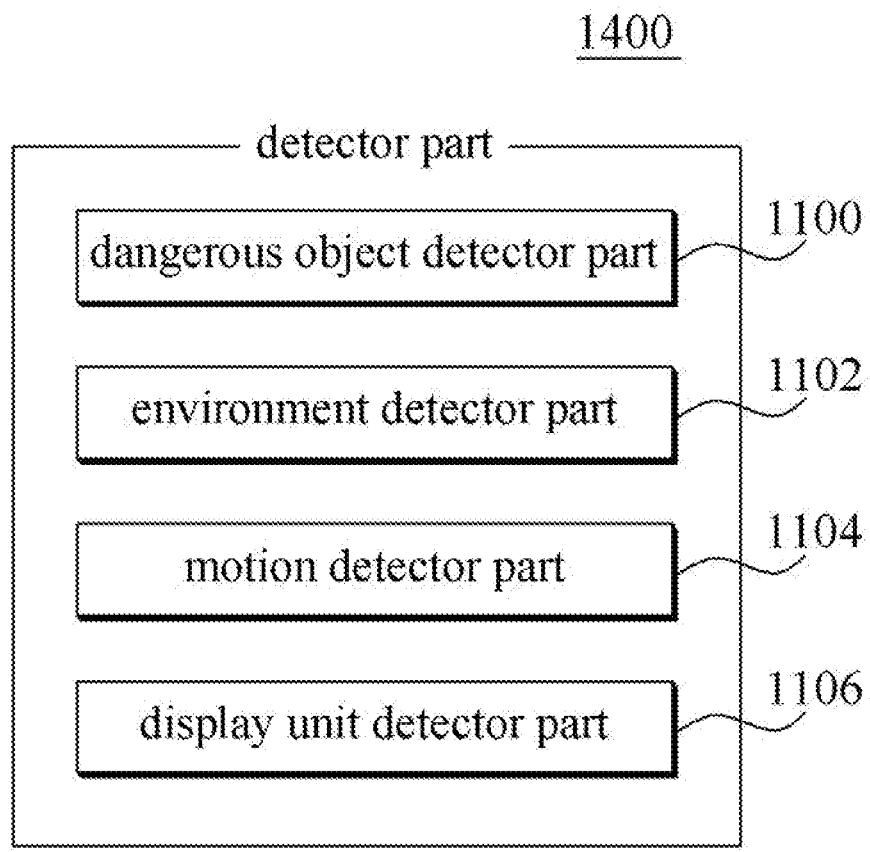

[Fig. 15]
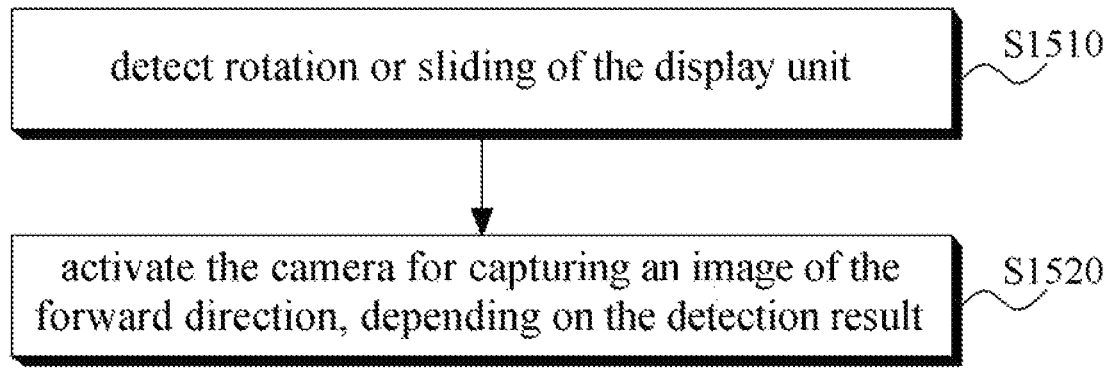

WEARABLE DISPLAY DEVICE HAVING A SLIDING STRUCTURE

CROSS-REFERENCE TO RELATED APPLICATIONS

This application is a continuation-in-part application of U.S. patent application Ser. No. 13/887,500 filed May 6, 2013, now issued as U.S. Pat. No. 9,329,391, which claims the benefit of Korean Patent Application Nos. 10-2012-0086484 (filed on Aug. 7, 2012), 10-2012-0092937 (filed on Aug. 24, 2012), 10-2013-0027645 (filed on Mar. 15, 2013), and 10-2013-0038272 (filed on Apr. 8, 2013) filed with the Korean Intellectual Property Office. The disclosures of the above applications are incorporated herein by reference in their entirety.

BACKGROUND

1. Technical Field

The present invention relates to a wearable display device.

2. Description of the Related Art

The HMD (head-mounted display), a representative type of wearable display device, was designed to provide a pilot with aviation information such as the altitude, velocity, etc., of the aircraft. Commercial products were first developed during the 1990's, and have attracted interest after 1997 due to their popularity.

The HMD may be worn on the head like goggles and may provide the vision of a large screen showing virtual images. The display used here typically has a size of 1 inch or less, which may be magnified a hundredfold with the application of highly advanced optical technology.

With the development and commercialization of accessory devices such as the HMD, further growth is anticipated in the field of wearable computing devices. While previous efforts have focused on developing the HMD for movies or games, rapid advances in the fields of display devices and visual communication, as exemplified by the trends towards higher performance and smaller sizes in computer systems and LCD's, have led to research on wearable monitors, with some products already commercially available.

The HMD market faced many difficulties in the market for the past few years, due to relatively high prices, but the market is expected to grow dramatically in step with the trends in the wearable computer industry. The wearable HMD is expected to expand to industrial sites, logistics warehouses, maintenance sites for large-scale equipment such as cars, airplanes, and ships, etc., as well as to the field of sports entertainment, such as car racing.

In particular, developments in processor and software technology enable the miniaturization of computing devices, and as such, the HMD is expected to evolve beyond simply displaying images to becoming a personal computing device analogous to the smart phone.

FIG. 1 illustrates an example of a wearable display device that can operate as a computing device.

Referring to FIG. 1, a wearable display device according to the related art can include an image viewer unit 100, a connection unit 102, a main unit 120 that includes an interface unit 104 and a processor unit 106, and a frame 110.

The frame 110 may form the main body of the wearable display device and, for example, can have a structure similar to a pair of glasses, as illustrated in FIG. 1. The frame can be structured to be wearable on the user's head, and the other components of the wearable display device may be coupled onto the frame 110.

The image viewer unit 100 may serve to show images and may be positioned in front of the user's eye.

The main unit 120, composed of the interface unit 104 and the processor unit 106, may be coupled to the frame 110, for example on a support part 110c of the frame 110 for wearing on the user's ear.

The interface unit 104 may provide an interface with which the user can input a control command. The interface unit 104 can include a number of buttons and can include a flat touch pad for inputting cursor movements. By using the interface unit 104, the user can input a necessary control command, such as for playing a video clip and searching information, for example.

The processor unit 106 may control the operations of the wearable display device for use as a computing device. The user's control commands inputted through the interface unit 104 may be provided to the processor unit 106, after which the processor unit 106 may then process the user's control commands.

In a wearable display device according to the related art, such as that illustrated in FIG. 1, the image viewer unit 100 may be installed in front of the user's eyes and may thus obstruct the user's field of vision when it is not in use.

Also, in the wearable display device according to the related art, the interface unit 104 may be fixed to the frame and exposed to the exterior, forming a structure that is vulnerable to damage caused by dust and moisture, etc.

Thus, the wearable display device according to the related art, when worn for extended periods, can cause considerable discomfort due to the obstruction of vision and can be more susceptible to damage.

SUMMARY

An aspect of the invention is to propose a wearable display device of which malfunctioning and damage can be prevented even when the device is worn for extended periods.

Also, an aspect of the invention is to propose a wearable display device that does not obstruct the user's field of vision when not in use.

One aspect of the invention provides a wearable display device that includes: a frame; a main unit coupled to the frame; a non-bending part, which includes a camera configured to capture an image of a forward direction, and which is coupled to the main unit and is configured to slide to a first position; a hinge coupled with the non-bending part; and a bending part, which is configured to provide image information to a user, and which is coupled with the hinge to rotate within a predefined angle. When the bending part is rotated, the camera is exposed to the exterior and moves from the first position to a second position.

Another aspect of the invention provides a wearable display device that includes: a frame; a main unit coupled to the frame; a non-bending part, which includes a camera configured to capture an image of a forward direction, and which is coupled to the main unit and is configured to slide to a first position; a bending part, which is configured to provide image information to a user, and which is configured to rotate according to a sliding motion of the non-bending part to be positioned in front of the user's eye; and a display unit detector part configured to detect the rotating of the bending part or the sliding motion. The camera is exposed to an exterior when the bending part is rotated, and the camera moves from the first position to a second position according to the result of the detecting.

Yet another aspect of the invention provides a method of controlling a wearable display device that includes: detecting a rotation or a sliding motion of a display unit which is configured to provide image information to a user; and activating a camera according to the result of the detecting, with the camera configured to capture an image of a forward direction. Here, the display unit may include: a non-bending part, which includes the camera, and which is coupled to the wearable display device and is configured to slide to a first position; and a bending part, which is configured to provide the image information, and which is configured to rotate according to a sliding motion of the non-bending part to be positioned in front of the user's eye. When the bending part is rotated, the camera is exposed to the exterior and moves from the first position to a second position.

An aspect of the invention makes it possible to prevent malfunctioning and damage, even when the device is worn for extended periods.

Also, an aspect of the invention can resolve the problem of the wearable display device obstructing the field of vision when not in use.

Additional aspects and advantages of the present invention will be set forth in part in the description which follows, and in part will be obvious from the description, or may be learned by practice of the invention.

BRIEF DESCRIPTION OF THE DRAWINGS

FIG. 1 illustrates an example of a wearable display device that can operate as a computing device.

FIG. 2 illustrates the structure in a first mode of a wearable display device according to an embodiment of the invention.

FIG. 3 illustrates the structure in a second mode of a wearable display device according to an embodiment of the invention.

FIG. 4 illustrates a wearable display device according to an embodiment of the invention before the display unit is bent.

FIG. 5 is a perspective view of the main unit 220 and the display unit 200 of a wearable display device according to an embodiment of the invention in the first mode.

FIG. 6 is a cross-sectional view of the wearable display device illustrated in FIG. 5.

FIG. 7 is a perspective view of the display unit of a wearable display device according to an embodiment of the invention, with the display unit shown after sliding.

FIG. 8A and FIG. 8B are perspective views of the display unit of a wearable display device according to an embodiment of the invention in the second mode.

FIG. 9 is a block diagram illustrating the modules of a wearable display device according to an embodiment of the invention.

FIG. 10 is a block diagram illustrating the modules of a wearable display device according to another embodiment of the invention.

FIG. 11 is a block diagram illustrating the modular composition of a detector part according to an embodiment of the invention.

FIG. 12 is a block diagram illustrating the modular composition of a dangerous object detector part according to an embodiment of the invention.

FIG. 13A, FIG. 13B and FIG. 13C are diagrams illustrating portions of a wearable display device according to another embodiment of the invention.

FIG. 14 is a block diagram illustrating the detector part of a wearable display device according to another embodiment of the invention.

FIG. 15 is a flow diagram illustrating a method of controlling a wearable display device according to an embodiment of the invention.

DETAILED DESCRIPTION

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like elements.

FIG. 2 illustrates the structure in a first mode of a wearable display device according to an embodiment of the invention, FIG. 3 illustrates the structure in a second mode of a wearable display device according to an embodiment of the invention, and FIG. 4 illustrates a wearable display device according to an embodiment of the invention before the display unit is bent.

In FIGS. 2 to 4, the first mode refers to a mode in which the image viewer function of the wearable display device is not used, while the second mode refers to a mode in which the image viewer function of the wearable display device is used.

Referring to FIGS. 2 to 4, a wearable display device according to an embodiment of the invention can include a display unit 200, a main unit 220, a hinge 202, and a frame 210.

The frame 210, to which the wearable display device may be coupled, can have a structure similar to that of a pair of glasses, for example, as illustrated in FIGS. 2 to 4. The frame may be structured to be wearable on a user's head, and other components of the wearable display device may be coupled onto the frame 210.

The frame 210 can be made from various materials including metals and dielectrics, but using a dielectric material can be considered so as not to influence computing operations and RF signal reception.

While FIG. 2 illustrates an example in which the frame is of a similar form to that of a pair of glasses, the frame 210 can take any form that is wearable on the user's body. For instance, the frame can take the form of a helmet or a set of headphones.

In cases where the frame has a form similar to a pair of glasses, an example of which is illustrated in FIG. 2, the frame may include two lens-mounting parts 210a, 210b. A user who needs prescription glasses can mount lenses onto the lens-mounting parts 210a, 210b for use.

Also, the frame 210 may include two support parts 210c, 210d for wearing the frame on the user's ears.

The main unit 220 can be equipped with a processor for controlling the wearable display device, and an interface can be provided by way of the main unit.

The main unit 220 may be coupled to the frame 210 and may be coupled, for example, on a support part 210c of the frame 210 intended for wearing on the user's ear.

The interface provided by the main unit 220 may serve to receive control information from the user and provide it to the processor. The interface may receive control information for turning the power on or off, as well as various control information related to the operation of the wearable display device, from the user. For example, various control commands such as for playing a video clip, making a voice call, searching information, etc., can be provided through the interface.

The interface can be implemented in various forms. For example, it is possible to provide control information through a number of buttons, and it is also possible to provide a flat touch pad such as that for a mouse controller on a laptop.

While the image viewer function is not being used (i.e. in the first mode), the main unit 220 and the display unit 200 may be coupled parallel to each other, as illustrated in FIG. 2. Since the main unit 220 and the display unit 200 are structured to overlap each other during this non-use state, the display unit 200 may operate as a cover that shields the interface formed on the main unit 220.

The display unit 200 may be slidably coupled with the main unit 220, and when the display unit is to be used, the display unit 200 may be slid preliminarily from the main unit 220, as illustrated in FIG. 4. The display unit 200 can be moved in a direction in which the area of overlap with the main unit 220 increases and its opposite direction, the direction in which the area of overlap with the main unit 220 decreases.

The sliding action which changes the arrangement in FIG. 2 to the arrangement in FIG. 4 can be applied manually, or a structure for automatically performing the sliding can also be used.

After the display unit 200 is preliminarily slid as in FIG. 4, the display unit 200 may be bent by way of a hinge 202 formed at a particular point, as illustrated in FIG. 3. The display unit 200 may be divided into the bending part 200a and the non-bending part 200b, each formed on either side of the hinge 202, where the bending part 200a can be bent within a preset angle after the sliding. In a wearable display device such as that illustrated in FIGS. 2 to 4, the bending part 200a can be bent by an angle of about 90 degrees.

Of course, unlike the structure illustrated in FIGS. 2 to 4, the sliding and the bending actions can be implemented simultaneously. For example, as the sliding is being performed, the bending angle of the bending part can be gradually increased, such that the final result is as shown in FIG. 3.

A display 200c which shows images on the display unit 200 may be formed on the bending part 200a, and by way of the bending action of about 90 degrees, the display may be positioned in front of the user's eye in the second mode.

In order to exchange information with one another, the main unit 220, bending part 200a, and non-bending part 200b can be connected by cables capable of transmitting electrical signals. Alternatively, the main unit 220, bending part 200a, and non-bending part 200b can exchange information wirelessly. Here, the exchanged information can include control information inputted through the interface formed on the main unit.

The display 200c formed on the display unit 200 may serve to show images and may provide the user with image information. The display 200c can have a size of about 1 inch in the form of a micro-display and can show images using various known methods. It may be preferable to have the display 200c be made of a transparent material, but the invention is not thus limited.

In order to show an image on the display 200c, an external light source can be used, or a self-illuminating system can be used.

An example of using a self-illuminating system is to use OLED's. An ODLED contains electrons and holes, which undergo an excitation state and then recombine to produce light. As it can emit light by itself, it is possible to show images without a separate external light source.

An example of using a system with an external light source is to use a transparent display. One such example is the TFT-LCD, which is structured such that light emitted from a fluorescent lamp is directed towards a liquid crystal panel by a device that reflects and disperses the light. The liquid crystal panel includes twisted nematic (TN) liquid crystals filled in between two glass sheets; the glass sheet on the side where light enters includes TFT and ITO pixels and a liquid crystal alignment layer, while the glass sheet on the other side is structured with a color filter and a coated liquid crystal alignment layer (polyimide).

Another example of using a system with an external light source is to use a reflective display. One example of a reflective display is the LCos, in which light is reflected with a reflective display to show images. A silicon substrate is mainly used for the display element, and it is possible to show images of a high resolution on a small display screen.

Although it is not illustrated in FIGS. 2 to 4, a protector part (not shown) for protecting the display unit 200 in the first mode can be additionally included. At least one surface of the protector part may be open, to enable the sliding of the display unit 200. For instance, the protector part can be structured to surround the display unit 200.

In the first mode, the display unit 200 may be positioned within the protector part, but in the second mode, it may move from the inside to the outside of the protector part.

FIG. 5 is a perspective view of the main unit 220 and the display unit 200 of a wearable display device according to an embodiment of the invention in the first mode, FIG. 6 is a cross-sectional view of the wearable display device illustrated in FIG. 5 across line A-A', and FIG. 7 is a perspective view of the display unit of a wearable display device according to an embodiment of the invention, with the display unit shown after sliding. FIG. 8A and FIG. 8B are perspective views of the display unit of a wearable display device according to an embodiment of the invention in the second mode. FIG. 8A and FIG. 8B are perspective views each illustrating the display unit from different directions.

Referring to FIG. 5 and FIG. 6, in the first mode (display unit not in use), the main unit 220 and the display unit 200 may be coupled parallel to each other, and the interface of the main unit 220 may not be exposed in the first mode. While FIGS. 5 and 6 illustrate an embodiment in which the main unit 220 and the display unit 200 have substantially the same sizes, this is merely one example, and it is obvious to those skilled in the art that the sizes can be different.

The hinge 202 may be formed on the display unit 200, so that the structure of the display unit 200 is bendable.

Referring to the cross-sectional view in FIG. 6 and the perspective views in FIGS. 7, 8A, and 8B, a guide hole 600 may be formed in the main unit 220, while a guide protrusion 610 corresponding to the guide hole 600 may be formed on the display unit 200.

The guide protrusion 610 may be inserted into the guide hole 600, and the end of the guide protrusion 610 may be larger than the guide hole 600 so that the display unit 200 does not become detached from the main unit 220.

By way of the guide protrusion 610 and guide hole 600 illustrated in FIGS. 6 and 7, the display unit 200 is able to slide from the main unit, with the range of sliding determined by the length of the guide hole 600.

Although it is not illustrated in FIGS. 6 and 7, an elastic structure can be additionally included, which fixes the position of the display unit 200 to either the arrangement shown in FIG. 2 or the arrangement shown in FIG. 4. In other words, a separate structure can be employed which may secure the guide protrusion 610 of the display unit 200 at one end or the other end of the guide hole 600.

According to another embodiment of the invention, the main unit 220 may not provide a processor and an interface, serving only as a base for the sliding, i.e. movement, of the display unit 200. Here, an additional main unit (not shown) that does include a processor and an interface can be coupled to a support part 210d opposite the support part 210c on which the main unit 220 is coupled. In this case, the additional main unit and the display unit 200 can exchange information wirelessly.

Referring to FIGS. 8A and 8B, a camera 700 may be coupled to the exposed surface 200d of the non-bending part 200b that is exposed when the bending part 200a of the display unit 200 is bent. The camera 700 may serve to acquire image information in the forward direction. Also, the camera can be activated according to the position of the non-bending part 200b. The camera can be activated when the non-bending part 200b moves in a first direction to be positioned in a preset region. For example, the camera can be activated when the non-bending part 200b is moved from the position in FIG. 2 to the position in FIG. 3.

Since the camera of the wearable display device can acquire image information in the forward direction at any time the wearable display device is worn, there is a concern that it may violate other people's privacy. Because of this, the wearable display device is often prohibited in certain places. In an embodiment of the invention, the camera may be coupled to the exposed surface 200d of the non-bending part that is exposed when the display unit 200 is in a bent state, so that the camera is only exposed during use.

Also, when the display unit 200 is slid from the main unit 220 to allow the use of the display unit 200, the interface 750 of the main unit 220 that was hidden by the display unit 200 may be exposed.

According to an embodiment of the invention, the sliding and bending actions of the display unit 200 can be implemented manually.

According to another embodiment of the invention, the sliding and bending actions of the display unit 200 can be implemented automatically by using a motor or an actuator, etc. On a particular point on the main unit 220, an interface button may be included for controlling the automatic sliding and bending actions. Of course, it is also possible to have just one of the sliding action and the bending action be automatically implemented by a motor or an actuator.

During use of the image viewer function (in second mode), when a preset condition is detected, the display unit 200 can be bent automatically. For example, if a danger condition is detected, the display unit 200 may be bent automatically to be removed from the user's field of vision. Here, the sliding action for converting to the first mode can also be implemented automatically.

The images acquired by the camera 700 can be analyzed for the detection of danger conditions. The processor of the wearable display device may analyze the image information acquired from the camera to determine whether or not a dangerous object such as an automobile is approaching the user, and if it is determined that there is a danger condition, may provide the control for an automatic rotation action that removes the display unit from the user's field of vision.

If there is no device included for automatically bending the display unit 200, it is also possible to have the processor output alarm information, prompting the user to bend the display unit 200.

According to another embodiment of the invention, a type of sensor unit (not shown) other than the camera 700 can be additionally included, where the sensor unit may acquire additional information for determining whether or not the user faces a dangerous condition.

For example, the sensor unit can detect information such as illuminance, temperature, etc., to provide information based on which to determine whether the user is located indoors or outdoors. If the user is located indoors, the processor can deactivate the function for detecting whether or not a dangerous object is approaching and the function for outputting alarm information, in order to reduce battery consumption.

Also, the sensor unit can detect the movement speed of the user, which can be utilized as supplementary information in determining whether or not to activate the function for detecting the approach of dangerous objects.

According to another embodiment of the invention, the processor can rotate the display unit 200 also in cases where the movement speed of the user exceeds a preset threshold.

According to yet another embodiment of the invention, the display unit 200 can be bent automatically when the power is turned off for the wearable display device or when an allowed usage time is exceeded.

A wearable display device based on an embodiment of the invention may preferably operate in a power-save mode during the first mode. When the display unit 200 is in contact with the main unit, it may be preferable to change the mode such that the image viewer function and audio output function are deactivated and only the function for outputting a preset alarm sound is activated.

FIG. 9 is a block diagram illustrating the modules of a wearable display device according to an embodiment of the invention.

Referring to FIG. 9, a wearable display device according to an embodiment of the invention can include a mode setter part 900, a processor 902, an interface receiver part 904, a video driver 906, and an audio driver 908.

The mode setter part 900 may serve to check the state of the display unit 200, i.e. whether the display unit is coupled with the main unit as in FIG. 2 or is rotated for use of the image viewer function, and may serve to set the settings to an operating mode corresponding to the checked state. If the display unit 200 is rotated and positioned in front of the user's eye, the wearable display device according to an embodiment of the invention may operate in a mode in which all functions are active.

When the display unit 200 is in the first mode, with the display unit 200 not rotated, the wearable display device according to an embodiment of the invention may operate in a mode in which only some of the functions are active.

The interface receiver part 904 may serve to receive from the user a control command for an interface and forward the user's control command to the processor 902.

The video driver 906 may serve to generate image signals that are to be shown on the image viewer unit 220. When the display unit 200 is in a retracted state, the functions of the video driver 906 may be deactivated.

The audio driver 908 may serve to generate audio signals that are to be provided to the user.

The processor 902 may control the overall operations of the wearable display device and may process any control commands when they are received from the user.

FIG. 10 is a block diagram illustrating the modules of a wearable display device according to another embodiment of the invention.

Referring to FIG. 10, a wearable display device according to another embodiment of the invention may include a detector part 1000, a bend control part 1002, a mode setter part 1004, a controller part 1006, an interface receiver part 1008, a setting part 1010, a video driver 1012, and an audio driver 1014.

The modules of the wearable display device illustrated in FIG. 10 may be for an embodiment in which the bending of the display unit 200 is achieved automatically by the use of a motor or an actuator.

The bend control part 1002 may control the bending operation of the display unit 200. The display unit 200 may be bent if the user requests the bending of the display unit 200 through the interface or if a condition is detected that is associated with a setting for bending the display unit 200.

The detector part 1000 may determine whether or not a condition occurs that is associated with a setting for bending the display unit. The detector part 1000 may determine whether or not a condition has occurred that is associated with a setting for bending the display unit by analyzing the information acquired by the camera 700 or an additional sensor unit.

FIG. 11 is a block diagram illustrating the modular composition of a detector part according to an embodiment of the invention.

Referring to FIG. 11, a detector part 1000 according to an embodiment of the invention may include a dangerous object detector part 1100, an environment detector part 1102, and a motion detector part 1104.

The dangerous object detector part 1100 may analyze the information acquired from the camera or the sensor unit to determine whether or not a dangerous object approaches the user. For instance, the dangerous object detector part 1100 can determine whether or not a dangerous object approaches the user by analyzing image information provided from the camera.

According to an embodiment of the invention, the dangerous object detector part 1100 may determine whether or not a dangerous object approaches the user by using at least one of an object feature, an object velocity, and an object direction or a combination thereof.

FIG. 12 is a block diagram illustrating the modular composition of a dangerous object detector part according to an embodiment of the invention.

Referring to FIG. 12, a dangerous object detector part 1100 according to an embodiment of the invention can include an object feature analyzer part 1200, an object velocity analyzer part 1202, an object direction analyzer part 1204, and a determiner part 1206.

The object feature analyzer part 1200 may analyze the images obtained at the camera to determine whether or not an object exists that corresponds to a dangerous object. The information on the features of a dangerous object can be learnt beforehand, and the object feature analyzer part 1200 may determine whether or not an object corresponding to a dangerous object feature learnt beforehand exists in the acquired images. Here, an object feature can include an object's shape information, color information, and the like.

The object feature analyzer part 1200 can determine whether or not a dangerous object exists in the acquired images by comparing the features of objects existing in the acquired images with the features of objects learnt beforehand. The comparing of object features is well known in the art and thus will not be elaborated here.

The object velocity analyzer part 1202 may serve to analyze the movement speed of a dangerous object, if it is determined that a dangerous object is present. Image information can be used for the velocity analysis can utilize, while a separate radar or ultrasonic sensor, etc., can also be used.

The object direction analyzer part 1204 may serve to analyze the movement direction of a moving object. The analysis of an object's direction can be performed by using the image information.

The determiner part 1206 may use the information analyzed by the object feature analyzer part 1200, object velocity analyzer part 1202, and object direction analyzer part 1204 to determine whether or not the user faces a dangerous condition.

It is obvious to the skilled person that the determiner part 1206 can not only determine whether or not the user faces a dangerous condition by considering all of the feature, velocity, and direction of an object, but also can be set to detect a danger simply if a dangerous object exists in front, irrespective of the velocity or direction of the object. In such cases, the dangerous object detector part can detect a danger by analyzing only the object features.

Also, even when a particular object is determined not to correspond to a dangerous object set beforehand, if it is determined at the object velocity analyzer part 1202 that the object is approaching the user with a velocity greater than or equal to a threshold velocity, the determiner part can determine that the user faces a dangerous condition.

The environment detector part 1102 may serve to detect whether the environment in which the user is located is outdoors or indoors. According to an embodiment of the invention, the issue of whether or not the user is indoors can be detected by using at least one of illuminance, light wavelengths, and temperature or a combination thereof.

The environment detector part 1102 can also determine whether or not the user is indoors by using radio signals. For example, if the user is indoors so that the reception rate of a GPS signal is equal to or lower than a threshold value, the environment detector part 1102 can determine that the user is located indoors. Also, the environment detector part 1102 can determine that the user is indoors by identifying certain RFID or NFC modules installed indoors.

The motion detector part 1104 may determine the movement speed of the user by using acceleration information detected from the sensor unit. The motion detector part 1104 may determine that the user faces a dangerous condition when the movement speed of the user is greater than or equal to a preset threshold value.

The setting part 1010 may serve to configure the activation/deactivation settings for the function of detecting and outputting danger information. As the function for detecting and outputting danger information may require a considerable amount of power, the setting part 1010 may deactivate this function of detecting and outputting danger information under certain circumstances, in order to increase the battery use efficiency.

According to an embodiment of the invention, the setting part 1010 may deactivate certain functions in response to the user's control command. For instance, the user may be provided with an interface for activating/deactivating the dangerous object detection function according to an embodiment of the invention, and if a control command for deactivating the detector function is selected by way of the interface, the setting part 1010 may deactivate the detector function.

According to another embodiment of the invention, the setting part 1010 can deactivate certain functions by using the detection information of the detector part 1000. For example, the setting part 1010 can deactivate the dangerous object detection function if the detector part 1000 determines that the user is located indoors. In another example, the setting part 1010 can deactivate the dangerous object detection function if the detector part 1000 determines that the user's movement speed is equal to or lower than a preset threshold speed.

FIG. 13A, FIG. 13B and FIG. 13C are diagrams illustrating portions of a wearable display device according to another embodiment of the invention.

Unlike the display unit 200 described with reference to FIG. 8A and FIG. 8B, the display unit illustrated in FIG. 13A and FIG. 13B has the camera 700 exposed to the exterior and moving from a first position to a second position when the bending part 200*a* is rotated. In other words, when the non-bending part 200*b* undergoes a sliding motion to the first position, the bending part 200*a* can rotate within a predefined angle to be positioned in front of the user's eye, and at this point, the camera 700 may move from the first position to the second position.

The second position may be a position that is further from the main unit 220 than the first position and may be a position that is further from the user's eye than the first position. That is, the camera 700 for capturing an image in the forward direction can protrude to the second position, as illustrated in FIG. 13A. Here, the non-bending part 200*b* can further include an actuator for protruding the camera 700 to the second position.

Alternatively, as illustrated in FIG. 13B, a portion of the non-bending part 200*b* can undergo a sliding movement so that the camera 700 may move to the second position. More specifically, the non-bending part 200*b* can include a capturing part 1310, which may include a camera 700 and which may move to the second position, and a panel part 1320, which may be coupled to the main unit 220 and the capturing part 1310 and which may move to the first position.

As described above with reference to FIG. 8A and FIG. 8B, the non-bending part 200*b* may slide in a first direction, and the capturing part 1310 can further slide along the first direction to move to the second position. Thus, the camera coupled to the exposed surface of the capturing part 1310 can move to the second position.

In order to prevent the bending part 200*a* from rotating from the orientation shown in FIG. 3 to the orientation shown in FIG. 4, the capturing part 1310 can be shaped such that a portion either touches or is in very close proximity to the bending part 200*a*, as illustrated in FIG. 13C. That is, in order that the bending part 200*a* may not rotate away from the user's eye, the capturing part 1310 can move to the second position to secure the bending part 200*a*.

With the camera illustrated in FIG. 8A and FIG. 8B, the view angle of the camera can be limited by the bending part 200*a*, but in the case of the camera illustrated in FIG. 13A and FIG. 13B, the camera can protrude in the forward direction more than the camera of FIG. 3, so that the problem of the bending part 200*a* limiting the camera's view angle can be resolved.

For the sliding movement of the capturing part 1310, the non-bending part 200*b* in a wearable display device according to an embodiment of the invention can further include sliding element for sliding the capturing part 1310 from the panel part 1320. Here, the sliding element can include the guide hole and guide protrusion described above with reference to FIG. 6 and FIG. 7. Depending on the implementation, the guide hole can be formed in the capturing part 1310 with the guide protrusion formed on the panel part 1320, or the guide hole can be formed in the panel part 1320 with the guide protrusion formed on the capturing part 1310.

FIG. 14 is a block diagram illustrating the detector part of a wearable display device according to another embodiment of the invention.

Unlike the detector part 1000 of FIG. 11, the detector part 1400 of FIG. 14 can further include a display unit detector part 1106.

When the bending part 200*a* rotates or slides to the position in front of the user's eye according to the sliding of the non-bending part 200*b*, The display unit detector part 1106 may detect the sliding motion of the non-bending part 200*b* or the rotation of the bending part 200*a*. Also, the camera 700 can move from the first position to the second position according to the detection result of the display unit detector part 1106.

When the bending part 200*a* has undergone a rotating, the bending part 200*a* may be positioned in front of the user's eye and the camera's view angle can be limited. Thus, an embodiment of the invention can enable a detection of the sliding motion or rotation of the display unit 200, and when the display unit 200 has undergone a rotating or a sliding movement, the camera 700 can be moved from the first position to the second position, so that the problem of the view angle of the camera 700 being limited can be resolved.

FIG. 15 is a flow diagram illustrating a method of controlling a wearable display device according to an embodiment of the invention.

A wearable display device according to an embodiment of the invention may detect a rotation or a sliding motion of the display unit 200 which provides the user with image information (S1510), and according to the results, may activate the camera 700 which captures the image of the forward direction. The camera 700 can be activated when the display unit 200 has undergone a rotating or a sliding movement.

Here, the display unit 200 may include a non-bending part 200*a*, which may include a camera 700 and which may be coupled to the wearable display device to slide to a first position, and a bending part 200*b*, which may provide image information and which may rotate according to the sliding of the non-bending part 200*a* to a position in front of the user's eye. Also, when the bending part 200*b* has rotated, the camera 700 may be exposed to the outside and may move from a first position to a second position.

Since the camera 700 moves to the second position to resolve the problem of the view angle being limited by the bending part 200*b*, the second position can be determined based on the thickness of the bending part 200*b*. The thinner the bending part 200*b*, the shorter the distance can be between the first position and the second position.

The technical features described above can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. A wearable display device comprising:
    a frame;
    a main unit coupled to the frame;
    a non-bending part coupled to the main unit and configured to slide to a first position, the non-bending part comprising a camera configured to capture an image of a forward direction;
    a hinge coupled with the non-bending part; and
    a bending part configured to provide image information to a user, the bending part coupled with the hinge to rotate within a predefined angle,
    wherein, when the bending part is rotated, the camera is exposed to an exterior and moves from the first position to a second position,
    wherein the second position is determined according to a thickness of the bending part so that the camera's view angle is not limited by the bending part.

2. The wearable display device of claim 1, wherein the second position is further away from the main unit than the first position.

3. The wearable display device of claim 1, wherein the non-bending part comprises:
    a capturing part comprising the camera and configured to move to the second position; and
    a panel part coupled to the main unit and the capturing part and configured to move to the first position.

4. The wearable display device of claim 3, wherein the capturing part moves to the second position and secures the non-bending part.

5. The wearable display device of claim 3, further comprising:
    a sliding element for sliding the capturing part from the panel part,
    wherein the sliding element comprises:
    a guide hole formed in the capturing part; and
    a guide protrusion formed on the panel part.

6. The wearable display device of claim 3, further comprising:
    a sliding element for sliding the capturing part from the panel part,
    wherein the sliding element comprises:
    a guide protrusion formed on the capturing part; and
    a guide hole formed in the panel part.

7. The wearable display device of claim 1, wherein the non-bending part comprises:
    an actuator configured to protrude the camera to the second position.

8. A wearable display device comprising:
    a frame;
    a main unit coupled to the frame;
    a non-bending part coupled to the main unit and configured to slide to a first position, the non-bending part comprising a camera configured to capture an image of a forward direction;
    a bending part configured to provide image information to a user, the bending part configured to rotate according to a sliding motion of the non-bending part to be positioned in front of a user's eye; and
    a display unit detector part configured to detect a rotating of the bending part or the sliding motion,
    wherein the camera is exposed to an exterior when the bending part is rotated, and the camera moves from the first position to a second position according to a result of the detecting,
    wherein the second position is determined according to a thickness of the bending part, so that the camera's view angle is not limited by the bending part.

9. The wearable display device of claim 8, wherein the second position is further away from the main unit than the first position.

10. The wearable display device of claim 8, wherein the non-bending part comprises:
    a capturing part comprising the camera and configured to move to the second position; and
    a panel part coupled to the main unit and the capturing part and configured to move to the first position.

11. The wearable display device of claim 10, wherein the capturing part moves to the second position and secures the non-bending part.

12. The wearable display device of claim 8, wherein the non-bending part comprises:
    an actuator configured to protrude the camera to the second position.

13. A method of controlling a wearable display device, the method comprising:
    detecting a rotation or a sliding motion of a display unit configured to provide image information to a user; and
    activating a camera according to a result of the detecting, the camera configured to capture an image of a forward direction,
    wherein the display unit comprises:
    a non-bending part comprising the camera, the non-bending part coupled to the wearable display device and configured to slide to a first position; and
    a bending part configured to provide the image information, the bending part configured to rotate according to a sliding motion of the non-bending part to be positioned in front of the user's eye,
    and wherein, when the bending part is rotated, the camera is exposed to an exterior and moves from the first position to a second position,
    wherein the second position is determined according to a thickness of the bending part so that the camera's view angle is not limited by the bending part.

14. The method of claim 13, wherein the camera is activated and moves from the first position to the second position when the bending part is positioned in front of the user's eye.

15. The method of claim 13, wherein the second position is further away from the user's eye than the first position.

\* \* \* \* \*